(12) United States Patent
Oda

(10) Patent No.: US 9,042,391 B2
(45) Date of Patent: May 26, 2015

(54) INFORMATION PROCESSING DEVICE

(75) Inventor: Yuichi Oda, Kanagawa (JP)

(73) Assignee: Kabushiki Kaisha Toshiba, Minato-Ku, Tokyo (JP)

(*) Notice: Subject to any disclaimer, the term of this patent is extended or adjusted under 35 U.S.C. 154(b) by 162 days.

(21) Appl. No.: 13/611,295

(22) Filed: Sep. 12, 2012

(65) Prior Publication Data

US 2013/0243003 A1 Sep. 19, 2013

(30) Foreign Application Priority Data

Mar. 16, 2012 (JP) ................. 2012-060809

(51) Int. Cl.
*G06F 12/14* (2006.01)
*H04L 29/08* (2006.01)

(52) U.S. Cl.
CPC ........... *G06F 12/14* (2013.01); *H04L 29/08549* (2013.01)

(58) Field of Classification Search
None
See application file for complete search history.

(56) References Cited

U.S. PATENT DOCUMENTS

| 5,513,337 | A  | * | 4/1996  | Gillespie et al. | 711/152 |
| 5,581,767 | A  | * | 12/1996 | Katsuki et al.   | 712/11  |
| 6,275,891 | B1 | * | 8/2001  | Dao et al.       | 710/317 |
| 6,374,286 | B1 | * | 4/2002  | Gee et al.       | 718/108 |
| 6,826,713 | B1 | * | 11/2004 | Beesley et al.   | 714/25  |
| 7,007,151 | B1 | * | 2/2006  | Ely et al.       | 711/202 |
| 7,516,322 | B1 | * | 4/2009  | Graham           | 713/160 |
| 2002/0051427 | A1 | * | 5/2002  | Carvey         | 370/254 |
| 2003/0093625 | A1 | * | 5/2003  | Beukema et al. | 711/147 |
| 2005/0053057 | A1 | * | 3/2005  | Deneroff et al.| 370/360 |
| 2008/0043757 | A1 | * | 2/2008  | Dielissen      | 370/400 |
| 2008/0084893 | A1 | * | 4/2008  | Lee            | 370/410 |
| 2008/0320161 | A1 | * | 12/2008 | Maruccia et al.| 709/232 |
| 2009/0135739 | A1 | * | 5/2009  | Hoover et al.  | 370/257 |
| 2010/0100934 | A1 | * | 4/2010  | Mejdrich et al.| 726/3   |
| 2012/0169755 | A1 | * | 7/2012  | Comparan et al.| 345/582 |
| 2012/0300693 | A1 | * | 11/2012 | Takahashi et al.| 370/315 |
| 2013/0191651 | A1 | * | 7/2013  | Muff et al.    | 713/193 |

FOREIGN PATENT DOCUMENTS

| JP | 2006-502650 | 1/2006 |
| JP | 2006-254450 | 9/2006 |
| JP | 2007-110706 | 4/2007 |
| JP | 2007-172575 | 7/2007 |
| JP | 2009-110512 | 5/2009 |
| JP | 2009-543416 | 12/2009 |

* cited by examiner

*Primary Examiner* — Hassan Kizou
*Assistant Examiner* — Hashim Bhatti
(74) *Attorney, Agent, or Firm* — White & Case LLP

(57) ABSTRACT

According to one embodiment, an information processing device is provided with a memory, a plurality of processors, a router group, and an address protection unit. The plurality of the processors generate memory access packets each of which defines memory access requests for the memory, the memory access packet including an access destination address and an access type. The router group is provide with first routers which are connected to the memory and second routers which form transfer paths between the first router and the plurality of the processors, and transmits the memory access packets generated by the plurality of the processors to the memory. The address protection unit examines the memory access packets which pass through the first routers to detect a violated memory access.

18 Claims, 11 Drawing Sheets

| ACCESS DESTINATION ADDRESS |
|---|
| STARTING ADDRESS, ENDING ADDRESS, OR ACCESS TYPE (read/write) |
| ACCESS SOURCE ID |

| APU ADDRESS MAP | CONTENT |
|---|---|
| 0x400000 | STARTING ADDRESS |
| 0x400004 | ENDING ADDRESS |
| 0x400008 | VIOLATED ACCESS TYPE |
| 0x40000c | ACCESS DESTINATION ADDRESS |
| 0x400010 | DETECTED VIOLATED-ACCESS TYPE |

FIG.6
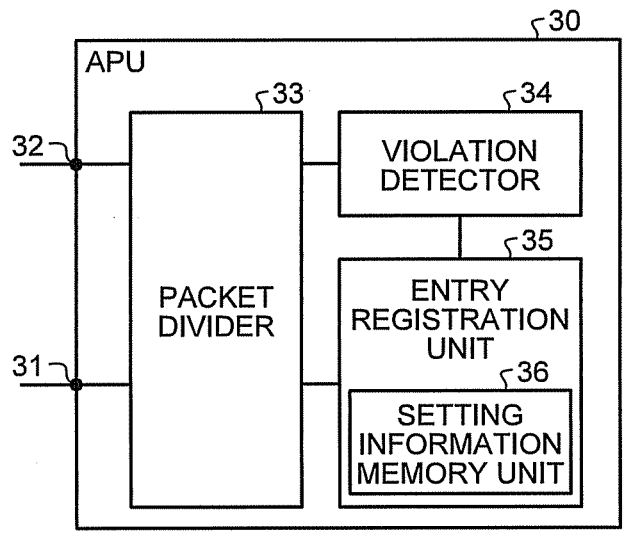
FIG.7
| ENTRY | STARTING ADDRESS | ENDING ADDRESS | ACCESS TYPE |
|---|---|---|---|
| 1 | 0x800000 | 0x810000 | read |
| 2 | 0x900000 | 0x980000 | read |
| ... | ... | ... | ... |
| n | 0x1000000 | 0x1800000 | write |
FIG.8
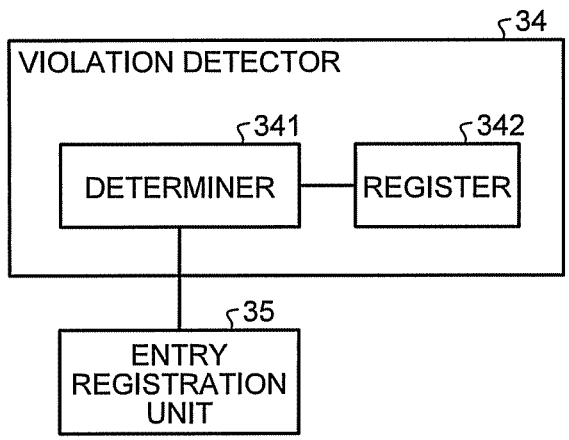

FIG.16
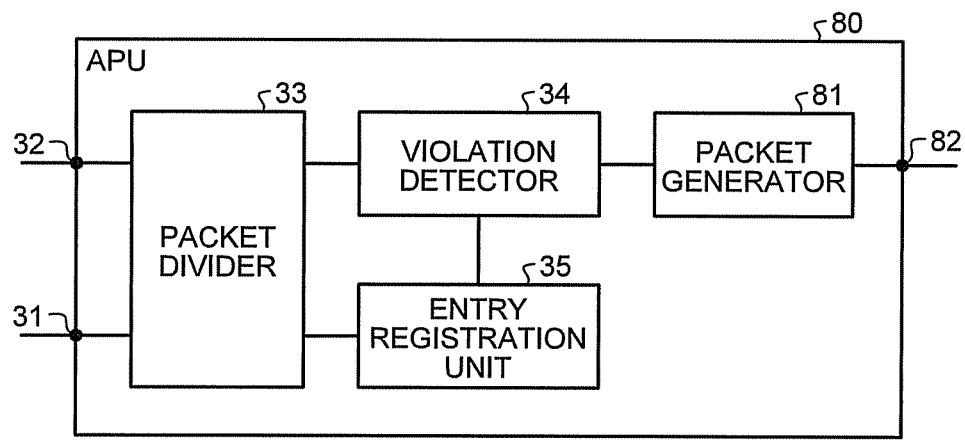
FIG.17
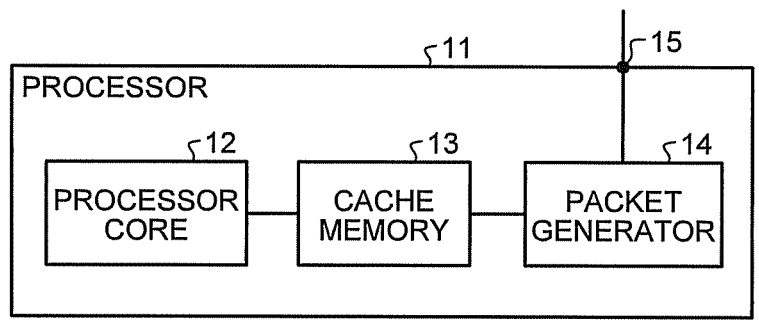
FIG.18
| ACCESS DESTINATION ADDRESS |
| DUMMY ACCESS FLAG |
| ACCESS TYPE (read/write) |
| ACCESS SOURCE ID |

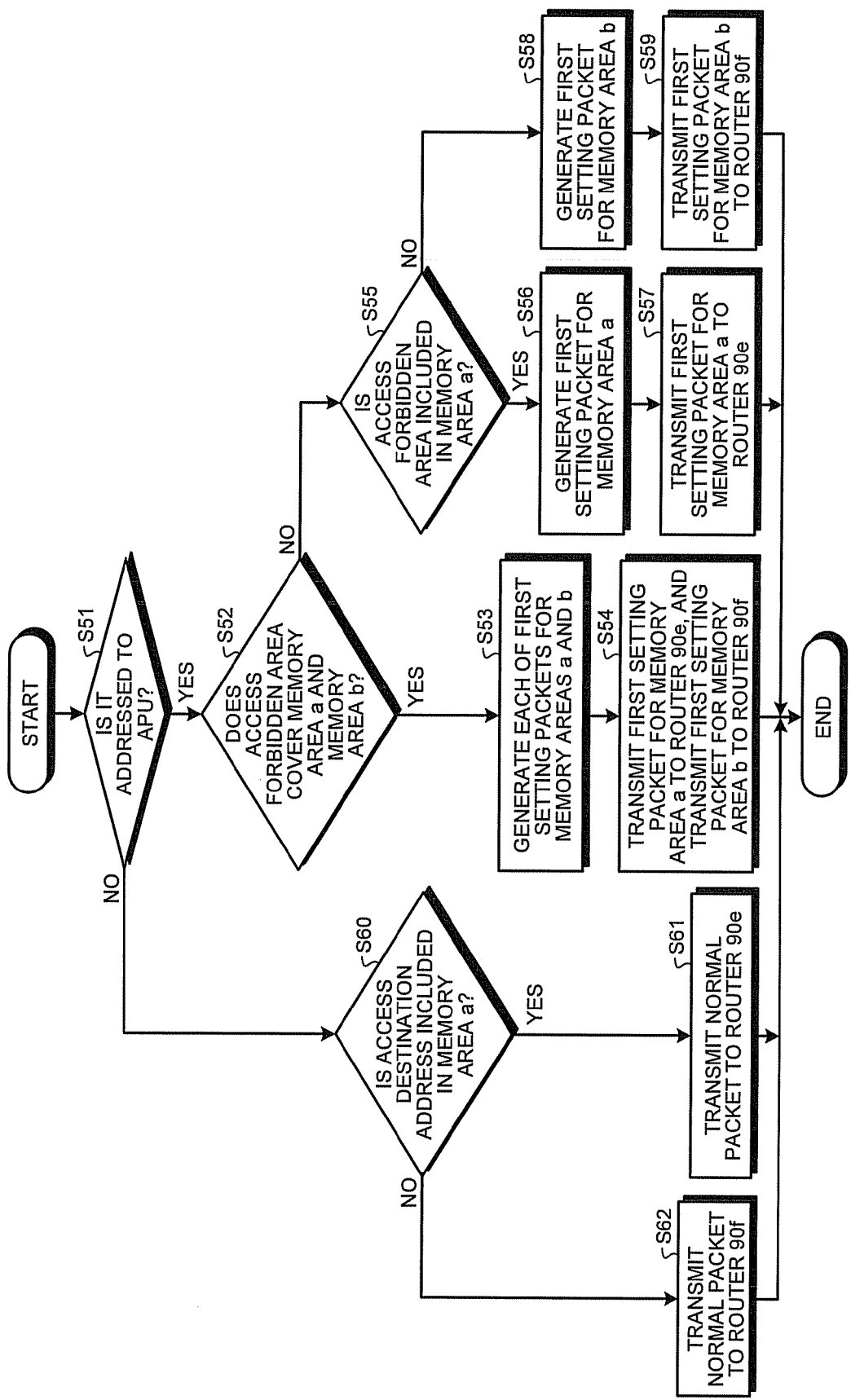

INFORMATION PROCESSING DEVICE

CROSS-REFERENCE TO RELATED APPLICATIONS

This application is based upon and claims the benefit of priority from Japanese Patent Application No. 2012-060809, filed on Mar. 16, 2012; the entire contents of which are incorporated herein by reference.

FIELD

Embodiments described herein relate generally to an information processing device.

BACKGROUND

In recent years, with the development of a technology in a process of manufacturing a semiconductor integrated circuit, a system LSI has been able to be highly integrated, and the number of the processors mounted in one chip tends to increase. On the other hand, in a bus-based system, the number of the processors which can be connected to the bus has restrictions in many cases. In addition, as an increase in data and control between the processors, the access to the bus becomes a bottleneck to the performance of the entire system. As one of solutions to improve the problem, a network-on-chip (NoC) may be exemplified. In the NoC, the processors are connected to each other through a router, the communication of data and control is realized using packets.

In addition, an address protection unit (APU) may be mounted as a mechanism for detecting an illegal memory access from the processor. The APU includes a table in which authorized (or forbidden) memory accesses are registered in advance. When there occurs the memory access from a processor, the APU refers to the table, and if the memory access is determined as an unauthorized access, the APU detects the access as a violated access.

BRIEF DESCRIPTION OF THE DRAWINGS

FIG. 6 is a diagram illustrating a configuration of an APU;

FIG. 7 is a diagram illustrating an example of a data structure of setting information which is stored in a setting information memory unit;

FIG. 8 is a diagram illustrating a configuration of a violation detector;

FIG. 16 is a diagram illustrating a configuration of an APU according to a third embodiment;

FIG. 17 is a diagram illustrating a configuration of a processor according to a fourth embodiment;

FIG. 18 is a diagram illustrating an exemplary specification of a dummy normal packet;

FIG. 23 is a flowchart for explaining an operation of the router according to the fifth embodiment which can perform transmission on the plurality of routers each connected to the APUs.

DETAILED DESCRIPTION

In general, according to one embodiment, an information processing device is provided with a memory, a plurality of processors, a router group, and an address protection unit. The plurality of the processors generate memory access packets each of which defines memory access requests for the memory, the memory access packet including an access destination address and an access type. The router group is provided with first routers which are connected to the memory and second routers which form transfer paths between the first router and the plurality of the processors, and transmits the memory access packets generated by the plurality of the processors to the memory. The address protection unit examines the memory access packets which pass through the first routers to detect a violated memory access.

Exemplary embodiments of the information processing device will be explained below in detail with reference to the accompanying drawings. The present invention is not limited to the following embodiments. Further, the invention is not limited to these embodiments. Herein, the description will be made in connection with the case where the information processing device according to the embodiments of the invention is applied to the NoC, but the information processing device according to the embodiments may be applied to an information processing system divided into a plurality of chips.

Figure 1:
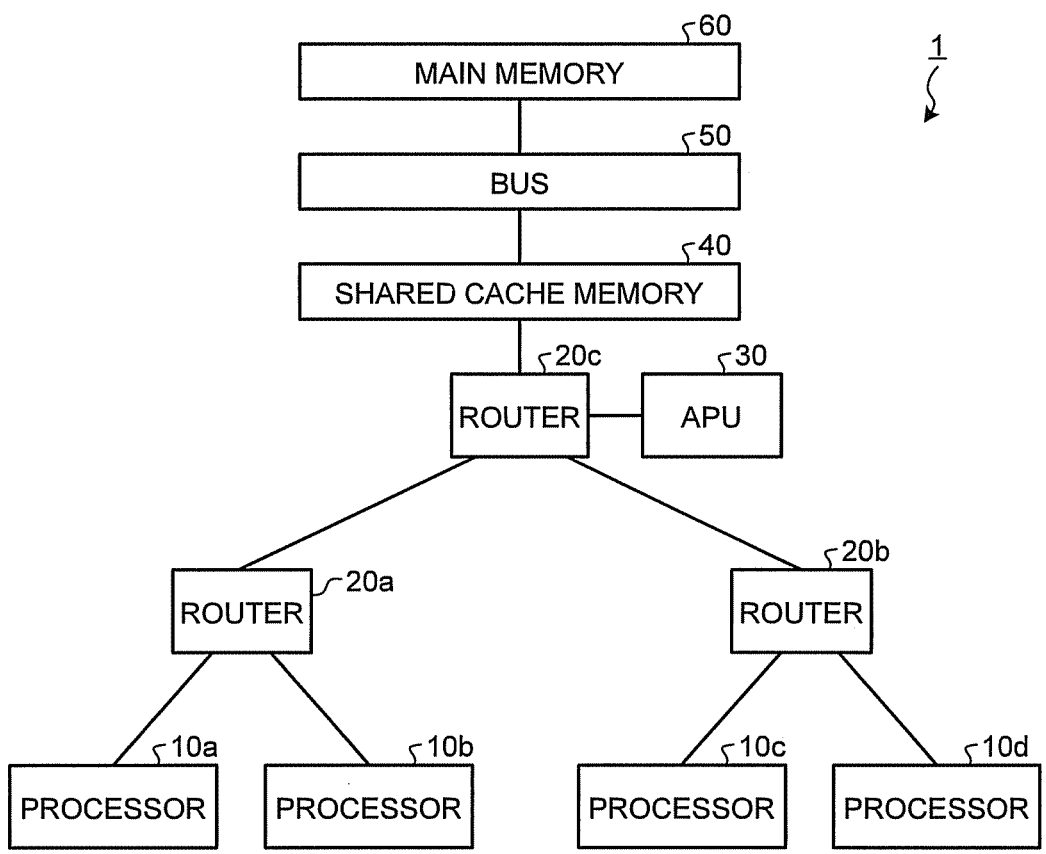
FIG. 1 is a diagram for explaining a configuration of a network-on-chip (NoC) according to a first embodiment of the invention.

FIG. 1 is a diagram for explaining an exemplary configuration of a NoC which serves as the information processing device according to a first embodiment of the invention. A NoC 1 of FIG. 1 is provided with processors 10a to 10d, routers 20a to 20c, an APU 30, a shared cache memory 40, a bus 50, and a main memory 60.

The processors 10a and 10b are connected to the router 20a, and the processors 10c and 10d are connected to the router 20b. In addition, the routers 20a and 20b are connected to the router 20c. In addition, the router 20c is connected to the shared cache memory 40, and the shared cache memory 40 is connected to the main memory 60 through the bus 50.

Herein, the router 20c connected to the shared cache memory 40 is referred to as the first router, and the routers 20a and 20b which form the transfer paths between the first router and the processors 10a to 10d are referred to as the second routers. In the first embodiment, only one first router is prepared and the router group (the routers 20a to 20c) does not include closed paths, and the routers are disposed in a tree structure in which the first router represents a root node and the second routers represent leaf nodes. Further, only two second routers are provided in the NoC 1 of FIG. 1, but the invention is not limited thereto. In addition, the leaf nodes of the second routers may be configured in a plurality of hierarchies. In addition, the number of the processors connected to the second routers is 1 or more.

The main memory 60 is a memory device which stores various kinds of data such as information processing result data of the processors 10a to 10d, initial values for the information processing, and a predetermined program for controlling the processors 10a to 10d.

The processors 10a to 10d, for example, execute information processing based on the predetermined program loaded onto the main memory 60, and store the information processing result data in the main memory 60.

The shared cache memory 40 is a memory device which is provided for the processors 10a to 10d to reduce an access time to the main memory 60 and operates in a higher speed and with a smaller capacity than the main memory 60. The shared cache memory 40 caches read/write data from the processors 10a to 10d targeting the main memory 60 as an access destination.

The APU 30 detects whether the processor commits the memory access violation. The APU 30 is connected to the router 20c which is the first router. Since all of the memory accesses from the processor 10a to 10d pass through the router 20c, the APU 30 can detect all of the memory access violations.

Figure 2:
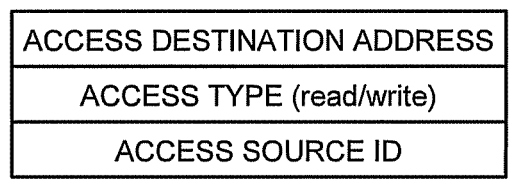
FIG. 2 is a diagram illustrating an example of a packet specification.
Figures 3, 4, 5:
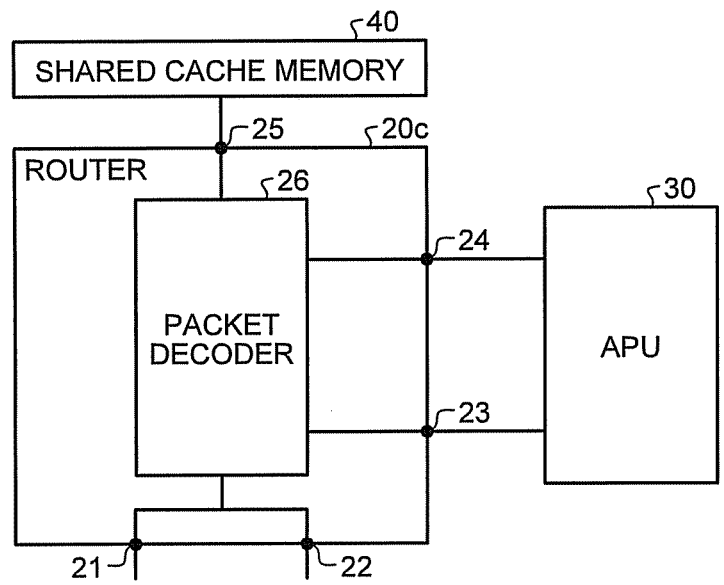
FIG. 3 is a diagram illustrating an example of a packet specification.
FIG. 4 is a diagram for explaining a mapping example of an address protection unit (APU)
FIG. 5 is a diagram illustrating a configuration of a router which is connected to an APU.

An exemplary specification of the packet for making the memory access request is illustrated in FIG. 2 and FIG. 3.

The packet illustrated in FIG. 2 is a packet generated in a normal memory access (herein below, referred to as a normal packet). In the normal packet, an access destination address, an access type, and an access source ID are defined. The access source ID is an identifier for identifying the processors 10a to 10d, so that it is possible to specify a processor where the memory access request is issued.

The packet illustrated in FIG. 3 is a packet (herein below, referred to as a setting packet) which is used to set conditions for detecting the memory access violation of the APU 30. In the setting packet, the access destination address, a forbidden condition or an authorization condition, and the access source ID are defined. As the forbidden condition, any one of a starting address of an access forbidden area, an ending address of the access forbidden area, and a violated access type is defined. The violated access type includes "read" and "write" which are expressed using binary information, for example. Herein, the description will be made in connection with an example where the forbidden condition is defined in the setting packet, but the authorization condition may be defined therein.

In this case, the APU 30 is mapped onto an address space of the NoC 1. Therefore, the access to the APU 30 is realized through an access to the address mapped to the APU 30 from the processors 10a to 10d.

FIG. 4 is a diagram for explaining a mapping example of the APU 30. The starting address of the access forbidden area is mapped to 0x400000, the ending address of the access forbidden area is mapped to 0x400004, and the violated access type is mapped to 0x400008, respectively. In other words, an address corresponding to the forbidden condition among 0x400000, 0x400004, and 0x400008 is used as the access destination address defined in the setting packet. Further, the access destination address and a detected violated-access type of FIG. 4 are related to the address of a register (a register 342 to be described later) in which a detection log of the violated memory access is stored, which are referred to at the time of debugging, for example. In FIG. 4, the access destination address is mapped to 0x40000c, at which an access destination address where the violated memory access has been made is stored. In addition, the detected violated-access type is mapped to 0x400010, at which the binary information is stored indicating whether the violated memory access having been detected corresponds to the read type or the write type.

Further, the access forbidden area (the starting address and the ending address), the violated access type, the access destination address, and the detected violated-access type are bound as a set, and items of a plurality of sets are mapped to the address space of the NoC 1. In other words, FIG. 4 illustrates a set among the plurality of sets.

FIG. 5 is a diagram illustrating a configuration of the router 20c. The router 20c has two input ports 21 and 22 and three output ports 23 to 25. The input port 21 is connected to the router 20a, and the input port 22 is connected to the router 20b. In other words, the input ports are provided only by the number of the second routers which are directly connected thereto. The output port 23 and the output port 24 are connected to the APU 30, and the output port 25 is connected to the shared cache memory 40. In addition, the router 20c is provided with a packet decoder 26.

When a packet arrives at any one of the input ports 21 and 22, the packet decoder 26 decodes the packet to extract the address information of the access destination. Then, the packet decoder 26 determines whether the packet is the setting packet or the normal packet based on the extracted address information. In a case of the setting packet, the packet is transmitted to the output port 24, and in a case of the normal packet, the packet is transmitted to the output ports 23 and 25.

FIG. 6 is a diagram illustrating a configuration of the APU 30. The APU 30 is provided with input ports 31 and 32. The input port 31 is connected to the output port 23 of the router 20c, and the input port 32 is connected to the output port 24 of the router 20c. In addition, the APU 30 is provided with a packet divider 33, a violation detector 34, and an entry registration unit 35.

The packet divider 33 receives the packet which has been transmitted from the router 20c through the input port 31 or the input port 32. In a case where the received packet is the normal packet, the packet divider 33 transmits the normal packet to the violation detector 34, and in a case where the received packet is the setting packet, the packet divider 33 transmits the setting packet to the entry registration unit 35. The packet divider 33 determines whether the received packet is the normal packet or the setting packet based on the input port through which the packet has been transmitted.

The entry registration unit 35 is provided with a setting information memory unit 36 which stores setting information defining a violation detecting rule.

FIG. 7 is a diagram illustrating an example of a data structure of setting information which is stored in a setting information memory unit 36. The setting information includes a table in which entries are registered including the starting address, the ending address, and the access type of the access forbidden area. In other words, the forbidden condition or the authorization condition is registered in each entry. Herein, the description will be made in connection with a case where only the forbidden condition is registered.

The entry registration unit 35 registers the entry in the setting information of the setting packet. Further, every field provided in the entries constructing the setting information is mapped to the address space of the NoC 1. For example, if it is assumed that Entry 1 corresponds to the set of FIG. 4, the fields of the starting address, the ending address, and the access type of Entry 1 are mapped to 0x400000, 0x400004, and 0x400008, respectively. The entry registration unit 35 determines the fields of a registration destination based on the access destination address of the setting packet, and registers the setting information defined therein.

FIG. 8 is a diagram illustrating a configuration of the violation detector 34. The violation detector 34 is provided with a determiner 341 and the register 342. The register 342 is a register which records the access destination address and the violated access type of the violated memory access having been detected at every violated memory access. Storage locations in the register 342 where the access destination address and the violated access type are stored are mapped to the address space, and the desired content of the violated memory access can be referred to by accessing the corresponding address.

When the normal packet is input, the determiner 341 bounds the access destination address and the access type of the normal packet as a set, and compares the set with the setting information stored in the setting information memory unit 36 to determine whether the normal packet corresponds to the violated memory access. In a case where it is determined that the access corresponds to the violated memory access, the determiner 341 stores the access destination address and the access type of the normal packet in the register 342.

Next, referring to FIG. 9 to FIG. 11, the operation of the NoC 1 according to the first embodiment will be described.

Figure 9:
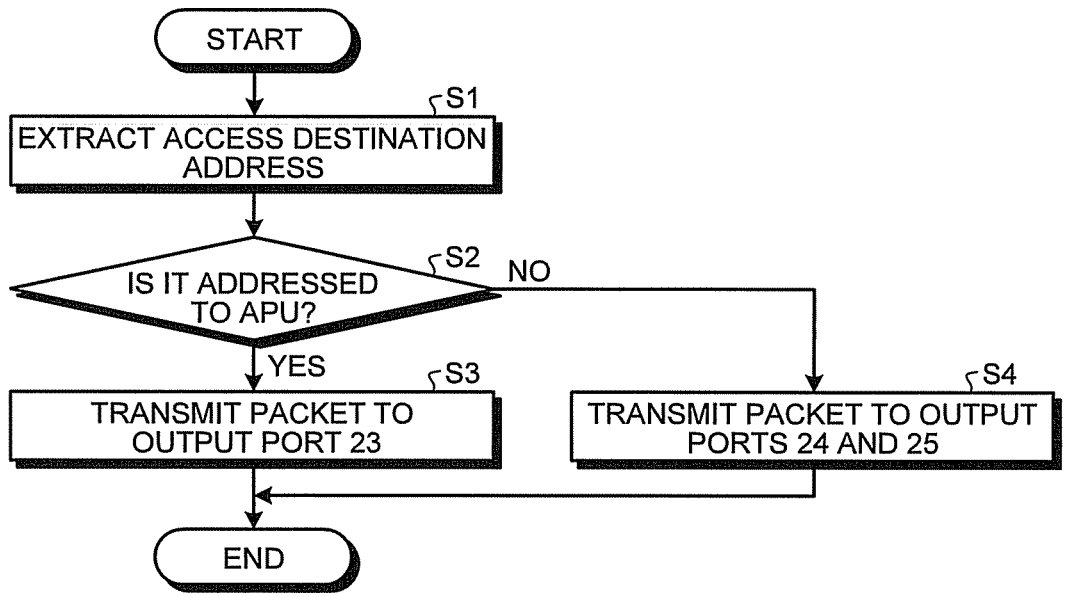
FIG. 9 is a flowchart for explaining an operation of a packet decoder which is provided in a router.

FIG. 9 is a flowchart for explaining the operation of the packet decoder 26 which is provided in the router 20c. When the processors 10a to 10d issue packets, the packets are input to the router 20c through the router 20a or the router 20b. The packet decoder 26 extracts the access destination address from the input packet (S1). Then, the packet decoder 26 determines whether the extracted access destination address is the address of the APU 30 (that is, the address where the APU 30 is mapped to) (S2). In a case where the access destination address is the address of the APU 30 (Yes in S2), since the packet is the setting packet, the packet decoder 26 transmits the setting packet to the output port 23 (S3), and terminates the operation. On the other hand, in a case where the extracted access destination address is not the address of the APU 30 (No in S2), since the packet is the normal packet, the packet decoder 26 transmits the normal packet to the output port 24 and the output port 25 (S4), and terminates the operation.

Figure 10:
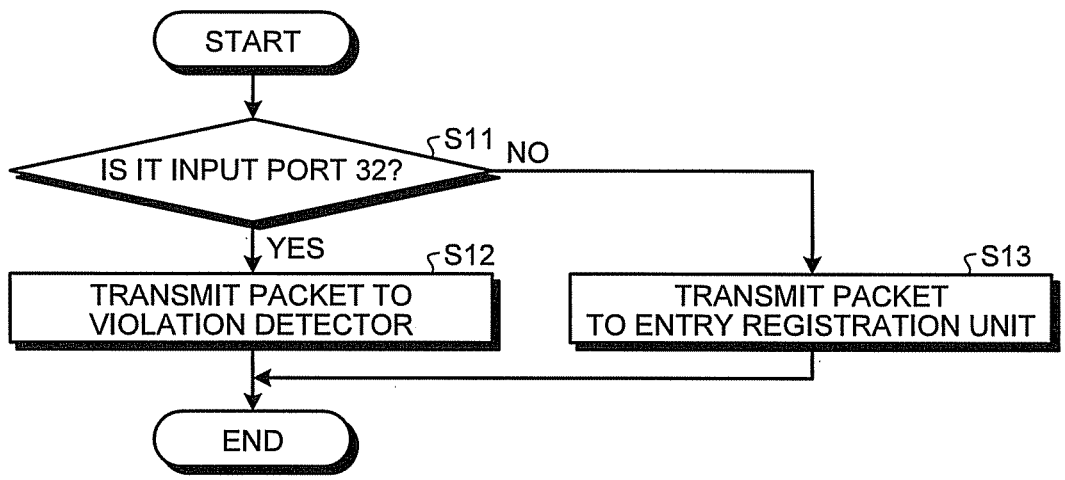
FIG. 10 is a flowchart for explaining an operation of a packet decoder which is provided in an APU.

FIG. 10 is a flowchart for explaining the operation of the packet divider 33 which is provided in the APU 30. When the packet is transmitted from the router 20c, the packet divider 33 determines whether the packet is input from the input port 31 or the input port 32 (S11). In a case where the packet is input from the input port 32 (Yes in S11), since the packet is the normal packet, the packet divider 33 transmits the packet to the violation detector 34 (S12), and terminates the operation. In a case where the packet is input from the input port 31 (No in S11), since the packet is the setting packet, the packet divider 33 transmits the packet to the entry registration unit 35 (S13), and terminates the operation.

Figure 11:
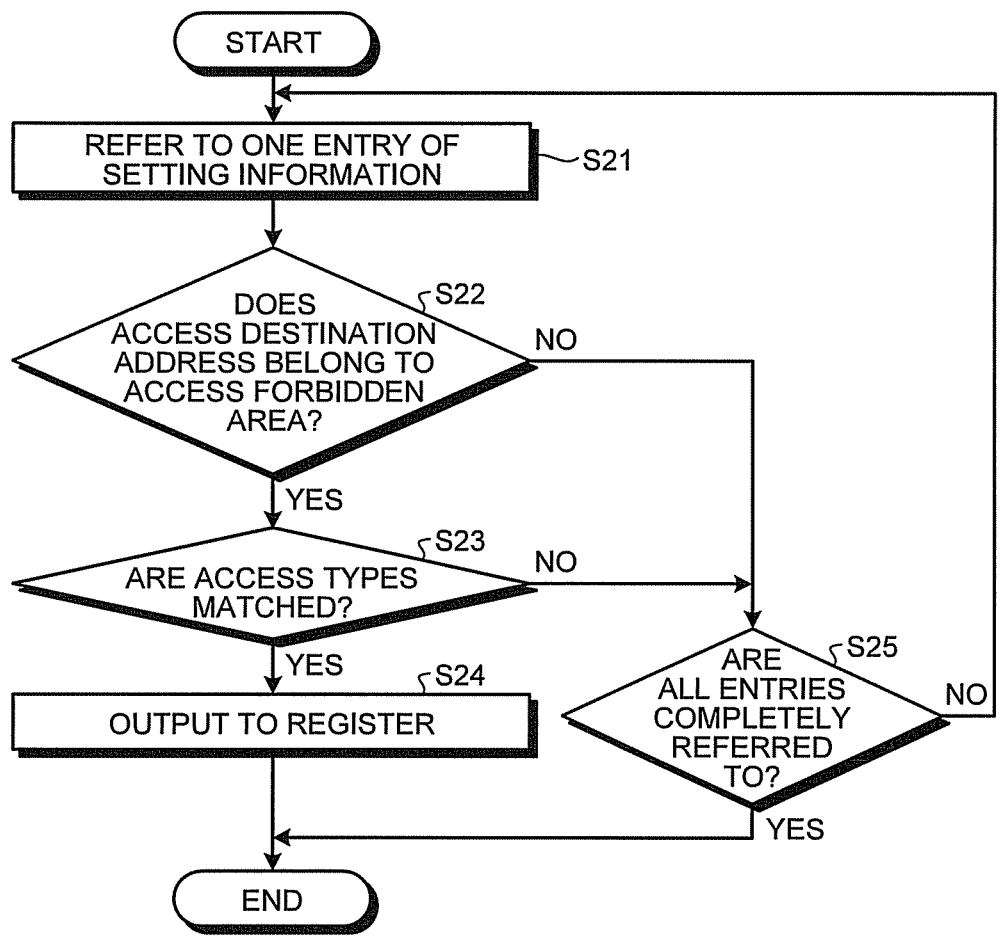
FIG. 11 is a flowchart for explaining an operation of a violation detector which is provided in an APU.

FIG. 11 is a flowchart for explaining the operation of the violation detector 34 which is provided in the APU 30. When receiving the normal packet, the violation detector 34 refers to the entry stored in the setting information memory unit 36 (S21) to determine whether the access destination address of the normal packet is included in the access forbidden area which has been set (S22). In a case where the access destination address belongs to the access forbidden area (Yes in S22), the violation detector 34 determines whether the access type of the normal packet is matched with the access type of the referred entry (S23). In a case where the access types are matched with each other (Yes in S23), the violation detector 34 outputs the access destination address and the access type of the normal packet to the register 342 (S24), and terminates the operation.

In a case where the access destination address of the normal packet is not included in the access forbidden area of the referred entry (No in S22), or in a case where the access types are not matched with each other (No in S23), the violation detector 34 determines whether all of the entries constituting the setting information are completely referred to (S25). In a case where all of the entries are completely referred to (Yes in S25), the violation detector 34 terminates the operation. In a case where there is an entry left unreferred (No in S25), the control moves to the process in S21 in which the violation detector 34 newly refers to an unreferred entry.

A technique which can be compared with the first embodiment (herein below, a comparative example) will be described. As the comparative example, a NoC having the tree structure in which the processors are individually provided with the APUs may be considered. The APUs individually detect the violated memory accesses of the processors connected thereto. In this case, the violated memory access can be detected in each processor.

However, in the comparative example, since one APU is provided for one processor, the APUs are necessarily provided by the number of the processors. On the contrary, in the NoC according to the first embodiment of the invention, since the packet passes through the router 20c serving as the root node, all of the violated memory accesses can be detected as long as the APU 30 is provided only in the router 20c. In other words, according to the first embodiment of the invention, the violated memory accesses can be detected using a small number of the APUs compared with the comparative example.

Further, in the above description, setting items included in each of the entries constituting the setting information have been assumed that each setting item is mapped to the address space, but how much roughly the elements of the setting information are mapped to the address space depends on the flexibility of a designer. In a case where at least every entry is mapped to the address space, a plurality of authorization conditions and forbidden conditions can be set. In addition, instead of mapping every entry to the address space, flags may be added to the setting packet and the normal packet in order to make an identification.

According to the first embodiment of the invention, since the NoC 1 has been configured such that the APU 30 examines the memory access request defined in the normal packet to detect the existence of the violated memory access and is connected to the router 20c which is a unique router connected to the shared cache memory 40. Therefore, it is possible to detect an illegal memory access using a small number of the APUs.

In addition, the APU 30 is configured such that the defined authorization or forbidden condition is registered at the access destination address defined in the setting packet, so that the processors 10a to 10d can register the setting information using a simple mechanism.

In addition, the router 20c is configured to determine whether the input packet is the normal packet or the setting packet based on whether the access destination address defined in the input packet is an address included in the setting information. In a case where the input packet is the normal packet, the router 20c transmits the normal packet to both the shared cache memory 40 and the APU 30, and in a case where the input packet is the setting packet, the router 20c transmits the setting packet to the APU 30. The APU 30 is configured to register the authorization or forbidden condition defined in the transmitted setting packet in the setting information. With this configuration, the APU 30 is able to acquire the setting information based on the setting packet input to the router 20c.

In addition, since the APU 30 is provided with the register 342 which stores the content of the detected violated memory access and is mapped to the address space, a detection result of the violated memory access can be acquired by indicating a corresponding address at the time of debugging or the like.

Figure 12:
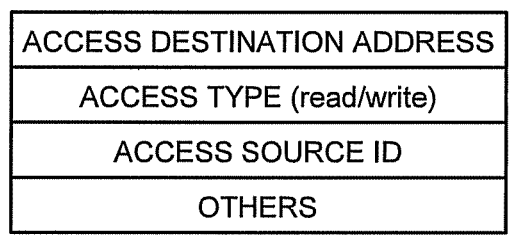
FIG. 12 is a diagram illustrating a normal packet in which unnecessary information is included.

In general, the packet generated by the processor may include information such as version information of a protocol specification and a priority of the packet, which are unnecessary for the detection of the violated memory access. FIG. 12 is a diagram illustrating the normal packet which includes the unnecessary information, in which the field of "Others" corresponds to the unnecessary information.

In this way, in a case where the unnecessary information is included in the normal packet, the first router connected to the shared cache memory may be configured to generate a packet from which the unnecessary information is erased.

Figure 13:
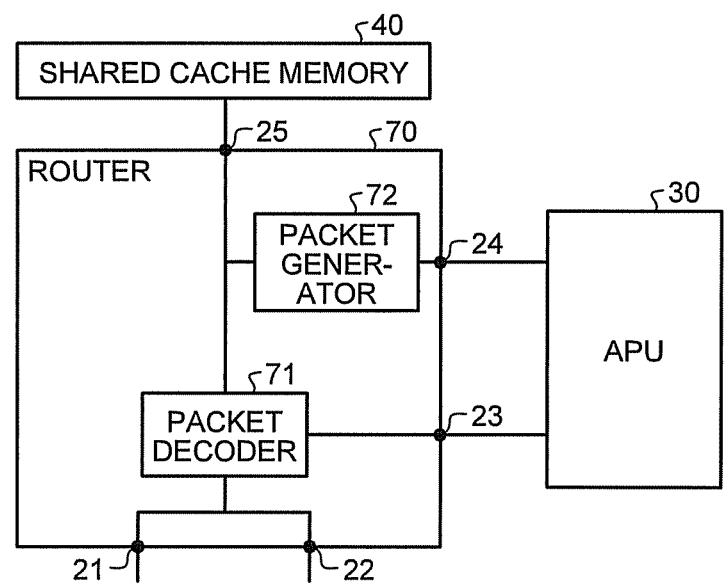
FIG. 13 is a diagram for explaining a configuration of a router according to a second embodiment in which the router is connected to a shared cache memory.

FIG. 13 is a diagram illustrating a configuration of a router 70 according to a second embodiment. The router 70 is provided with the input ports 21 and 22, the output ports 23 to 25, a packet decoder 71, and a packet generator 72. Further, the same components as those in the first embodiment will be denoted by the same reference numerals, and the redundant descriptions will not be provided.

Figure 14:
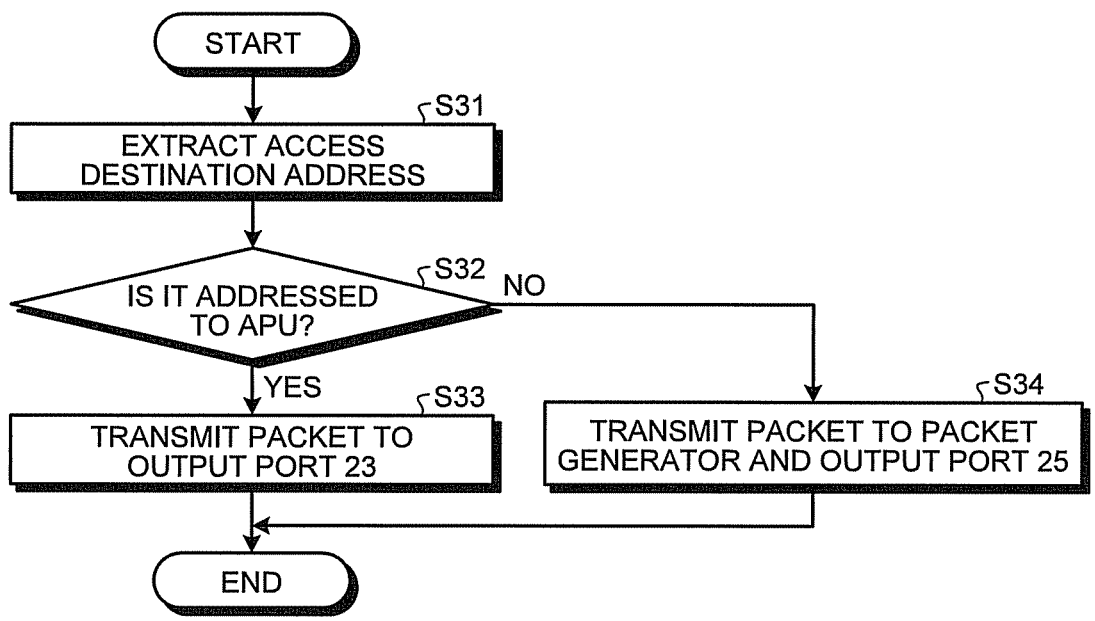
FIG. 14 is a flowchart illustrating an operation of a packet decoder which is provided in the router according to the second embodiment.

FIG. 14 is a flowchart illustrating the operation of the packet decoder 71. When receiving a packet from the input port 21 or the input port 22, the packet decoder 71 performs the extraction of the access destination address from the input packet (S31). Then, the packet decoder 71 determines whether the extracted access destination address is the address of the APU 30 (S32). In a case where the access destination address is the address of the APU 30 (Yes in S32), since the packet is the setting packet, the packet decoder 71 transmits the setting packet to the output port 23 (S33), and terminates the operation. On the other hand, in a case where the extracted access destination address is not the address of the APU 30 (No in S32), since the packet is the normal packet, the packet decoder 71 transmits the normal packet to the packet generator 72 and the output port 25 (S34), and terminates the operation.

Figure 15:
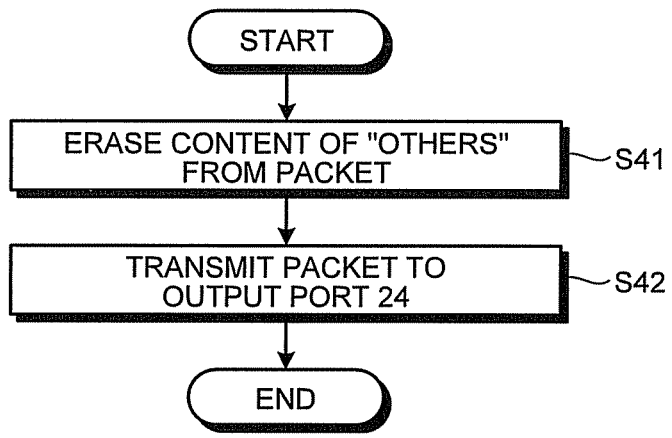
FIG. 15 is a flowchart illustrating an operation of a packet generator which is provided in the router according to the second embodiment.

FIG. 15 is a flowchart illustrating the operation of the packet generator 72. When receiving the normal packet through the process in S34, the packet generator 72 erases the content of "Others" from the input packet to generate a new packet (S41). Then, the packet generator 72 transmits the generated packet to the output port 24 (S42), and terminates the operation.

In this way, according to the second embodiment, even in a case where the unnecessary information is included in the normal packet as well as the information required for detecting the violated memory access, the router 70 erases the unnecessary information to make it possible for the APU 30 to generate packets in a registerable format.

According to a third embodiment, when the violated memory access is detected, the processor which has made the violated memory access is informed of a notification on the violated memory access.

FIG. 16 is a diagram illustrating a configuration of an APU according to the third embodiment. An APU 80 according to the third embodiment is provided with the input ports 31 and 32, an output port 82, the packet divider 33, the violation detector 34, the entry registration unit 35, and a packet generator 81.

The packet generator 81 is connected to the violation detector 34. When the violation detector 34 detects the violated memory access, the packet generator 81 makes the processor, which has had the violated memory access, addressed as a destination and generates the packet defining the notification on the detection of the violated memory access. Then, the generated packet is sent to the output port 82. The output port 82 is connected to the router 20c, and the packet is sent to the processor which has had the violated memory access.

According to the third embodiment of the invention, the APU 80 has been configured to include the packet generator 81 which makes the processor, which has had the violated memory access, addressed as the destination and generates a notification packet defining the notification on the detection of the violated memory access. Therefore, when having the violated memory accesses, the processors 10a to 10d can recognize that the violated memory accesses have been made.

In a case where a cache memory is included in the processor, the memory access hits the cache memory, and the packet is not output to the outside of the processor. Therefore, in the configuration of the first embodiment, the APU is not able to detect the violated memory access in which the memory access request is not output from the processor.

For this reason, in a fourth embodiment, the processor is provided with a mechanism to send a dummy packet to the outside of the processor. The dummy packet is sent in a case where an access hits a cache memory in the processor.

FIG. 17 is a diagram illustrating a configuration of the processor according to the fourth embodiment. A processor 11 is provided with a processor core 12, a cache memory 13, a packet generator 14, and an output port 15.

The output port 15 is connected to the router. The processor core 12 performs the information processing and issues the memory access request when accessing the main memory 60. The cache memory 13 is a cache memory which is provided in the processor 11 in order to reduce the access time to the shared cache memory 40 or the main memory 60. In a case where the memory access request issued from the processor core 12 hits the cache memory 13, the packet generator 14 generates a dummy normal packet defining the memory access request and sends the generated packet to the output port 15. In addition, in a case where the memory access request has not hit the cache memory 13, the packet generator 14 generates the normal packet and sends the normal packet to the output port 15.

FIG. 18 is a diagram illustrating an exemplary specification of the dummy normal packet. The dummy normal packet is configured such that a dummy access flag is added to the normal packet illustrated in FIG. 2.

Further, in a case where the received packet is the dummy normal packet, the packet decoder 26 provided in the first router may be configured not to transmit the dummy normal packet to the output port 25, but only to the output port 24.

According to the fourth embodiment of the invention, in a case where the memory access request hits the cache memory 13, since the processor 11 is configured to include the packet generator 14 which generates the dummy normal packet defining the memory access request and sends the generated packet to the router, the dummy normal packet is transmitted to the APU 30. Therefore, even in a case where the cache memory is provided in the processor, the violated memory access can be detected.

Figure 19:
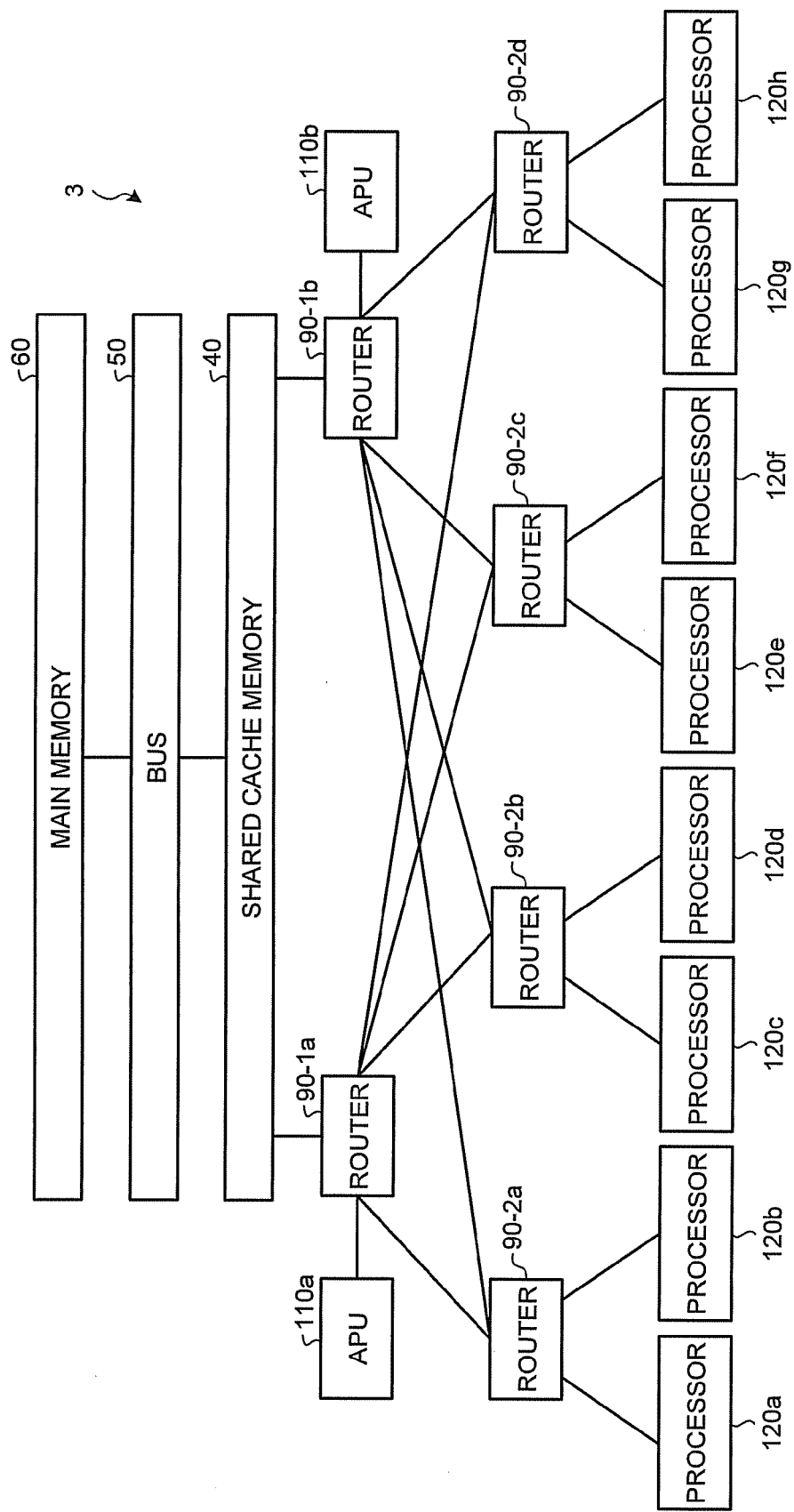
FIG. 19 is a diagram illustrating a configuration of a NoC according to a fifth embodiment.

FIG. 19 is a diagram illustrating a configuration of a NoC 3 according to a fifth embodiment. The NoC 3 according to the fifth embodiment is provided with processors 120a to 120h, routers 90-1a, 90-1b, and 90-2a to 90-2d, the shared cache memory 40, the bus 50, the main memory 60, and APUs 110a and 110b.

The routers 90-1a and 90-1b (the first routers) are connected to the shared cache memory 40. In addition, both the routers 90-1a and 90-1b are connected to the routers 90-2a to 90-2d (the second routers). The router 90-2a is connected to the processor 120a and the processor 120b; the router 90-2b to the processor 120c and the processor 120d; the router 90-2c to the processor 120e and the processor 120f; and the router 90-2d to the processor 120g and the processor 120h, respectively. In other words, the routers 90-1a, 90-1b, and 90-2a to 90-2d are formed in a graphic structure. Further, among the graphic structures, a structure which has no closed path is classified into the tree structure.

The APU 110a is connected to the router 90-1a, and the APU 110b is connected to the router 90-1b. The configurations inside the APUs 110a and 110b are similar to those of the first embodiment, and thus the descriptions thereof will not be repeated. In this case, memory areas Which become target areas of the APUs 110a and 110b for detecting the violated memory accesses are statically set in advance such that the memory areas do not overlap each other (that is, an exclusive manner). For example, the APU 110a sets a memory area a from 0x0 to 0xffffffff and the APU 110b sets a memory area b from 0x80000000 to 0xffffffff as the target areas for detecting the violated memory accesses, and at least parts are set as the access forbidden areas. In addition, the addresses mapped to the APU 110a and the APU 110b may also be statically set.

Figure 20:
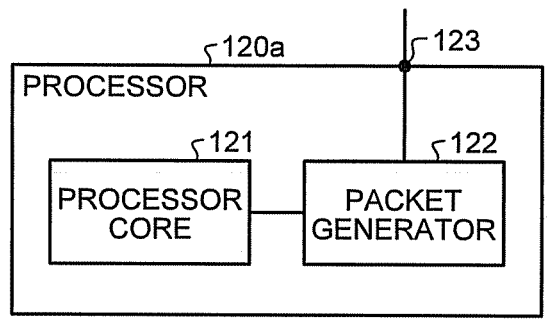
FIG. 20 is a diagram illustrating a configuration of processor according to the fifth embodiment.

FIG. 20 is a diagram illustrating a configuration of the processor 120 according to the fifth embodiment. The processors 120a to 120h are provided with the similar configuration as described above except the routers connected thereto.

The processor 120 is provided with a processor core 121, a packet generator 122, and an output port 123. The output port 123 is connected to the router 90-2. The processor core 121 issues the normal packet for making the memory access request when accessing the main memory 60, and issues the setting packet defining the forbidden condition or the authorization condition when setting the conditions of the APU 110a or the APU 110b. When receiving the memory access request, the packet generator 122 may assign the access source ID to the memory access request to generate the normal packet. In addition, when receiving the setting packet, the packet generator 122 may assign the access source ID to the APU setting request to generate a second setting packet. Further, in the fifth embodiment, the setting packet illustrated in FIG. 3 will be referred to as a first setting packet.

Figure 21:
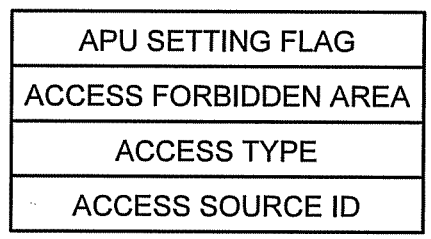
FIG. 21 is a diagram illustrating a setting packet according to the fifth embodiment.

FIG. 21 is a diagram illustrating the second setting packet. The second setting packet defines an APU setting flag, the forbidden condition, the access type, and the access source ID. The forbidden condition includes the starting address and the ending address of the access forbidden area. The APU setting flag is a flag indicating that the corresponding packet is a packet for setting the condition of the APU.

The router 90-2 can make both the routers 90-1a and 90-1b, which are connected to the respective APUs, the transfer destinations for the packet. In addition, the APUs 110a and 110b are different in the memory areas which are the target areas for detecting the violated memory access. Then, the router 90-2 switches the transfer destinations of the packet based on the memory area to which the access destination address or the access forbidden area defined in the received packet belongs.

Figure 22:
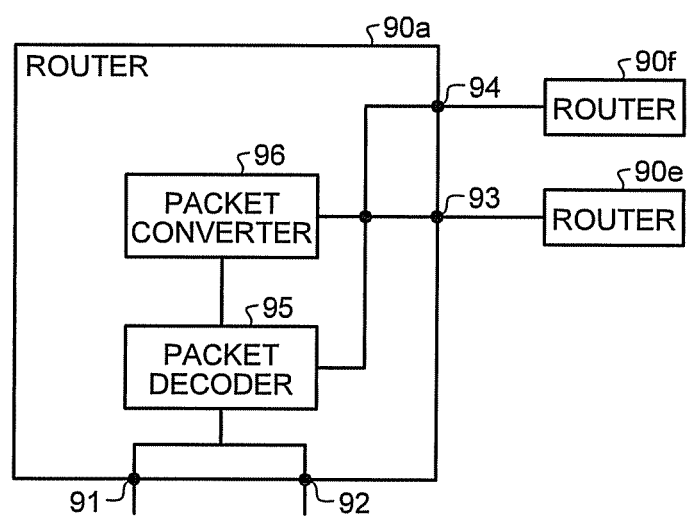
FIG. 22 is a diagram illustrating a configuration of a router according to the fifth embodiment which can perform transmission on a plurality of routers each connected to APUs.

FIG. 22 is a diagram illustrating a configuration of the router 90-2. The router 90-2 is provided with input ports 91 and 92, output ports 93 and 94, a packet decoder 95, and a packet converter 96. The input ports 91 and 92 are connected to another processor 120; the output port 93 to the router 90-1a; and the output port 94 to the router 90-1b, respectively.

The packet decoder 95 transmits the second setting packet among the input packets to the packet converter 96. In addition, the packet decoder 95 transmits the normal packet among the input packets to the output port 93 or 94 based on the defined access destination address.

The packet converter 96 transmits the first setting packet converted from the second setting packet to the output port 93 or 94. The packet converter 96 performs transmission depending on the determination based on which one of the memory area a and b is set as the defined access forbidden area. Further, the second setting packet includes the setting items such as the starting address and the ending address of the access forbidden area and the access type. Therefore, through the conversion of the second setting packet, three first setting packets are generated.

FIG. 23 is a diagram for explaining the operation of the router 90-2.

When a packet is input to the router 90-2, the packet decoder 95 examines the existence of the APU setting flag in the packet to determine whether the second setting packet is addressed to the APU (S51).

In a case where the input packet is the second setting packet addressed to the APU (Yes in S51), the packet converter 96 determines whether the access forbidden area defined in the second setting packet covers the memory area a and the memory area b (S52). In a case where the access forbidden area covers the memory area a and the memory area b (Yes in S52), the packet converter 96 converts the second setting packet to generate two first setting packets in which one packet is for setting the memory area a as the access forbidden area and the other packet is for setting the memory area b as the access forbidden area (S53). Specifically, the packet converter 96 divides the access forbidden area into an area included in the memory area a and an area included in the memory area b to generate the first setting packets for setting each of the divided access forbidden areas as a new access forbidden area. Thereafter, the packet converter 96 transmits the first setting packet for setting the memory area a as the access forbidden area to the router 90-1a; the first setting packet for setting the memory area b as the access forbidden area to the router 90-1b (S54), and terminates the operation.

In addition, in a case where the access forbidden area defined in the second setting packet does not cover the memory area a and the memory area b (No in S52), the packet converter 96 further determines whether the access forbidden area is included in the memory area a (S55). In a case where the access forbidden area is included in the memory area a (Yes in S55), the packet converter 96 converts the second setting packet to generate the first setting packet (S56); transmits the first setting packet to the router 90-1a (S57), and terminates the operation. In a case where the access forbidden area is not included in the memory area a (No in S55), the packet converter 96 converts the second setting packet to generate the first setting packet (S58); transmits the first setting packet to the router 90-1b (S59), and terminates the operation.

On the other hand, in a case where the packet input to the router 90-2 is not addressed to the APU (No in S51), that is, in a case where the packet is the normal packet, the packet decoder 95 further determines whether the access destination address defined in the normal packet is included in the memory area a (S60). In a case where the access destination address is included in the memory area a (Yes in S60), the packet decoder 95 transmits the normal packet to the router 90-1a (S61), and terminates the operation. In a case where the access destination address is not included in the memory area a (No in S60), the packet decoder 95 transmits the normal packet to the router 90-1b (S62), and terminates the operation.

The configuration of the router 90-2 in FIG. 22 illustrates a router which is configured to be able to directly transmit the packet to both routers 90-1 to which the APUs are connected.

Further, in a case where the router 90-2 directly connected to the router 90-1 receives the packet from another router 90-2, the packet-sending router 90-2 may be configured to include the packet decoder 95 and the packet converter 96 mounted therein. In other words, the packet decoder 95 and the packet converter 96 may be mounted in any one of the routers 90-2 located between the processors and the routers 90-1. In addition, the router 90-1 may be configured to include the packet decoder 95 and the packet converter 96 mounted therein, and the router 90-2 may have a function to determine the transfer destination based on which one of the memory area a and the memory area b is set as the access destination or which one of them is the target for setting the memory forbidden area.

According to the fifth embodiment of the invention, the routers 90-2 which can perform transmission to the plurality of the routers 90-1 provided with the APUs connected thereto are configured to select one of routers 90e and 90f based on the memory area which is the target area of the corresponding APU for detecting the violated memory access and where the access destination address indicated by the normal packet belongs, and the normal packet is passed through the routers 90e and 90f. Even in a case where there are a plurality of the routers 90-1 which are directly connected to the shared cache memory 40, since the illegal memory access can be detected by making the APUs disposed at the routers 90-1, the illegal memory access can be detected using a small number of the APUs.

In addition, the router 90-2 is configured to select the router of the transfer destination of the first setting packet based on the memory area which is the target area of the corresponding APU for detecting the violated memory access and where the area indicated by the authorization condition or the forbidden condition defined in the second setting packet belongs. Even in a case where there are the plurality of the routers to which the APUs are connected, the setting packet can be transmitted to the APU, the target to be set.

In addition, the router 90-2 is configured to include the packet converter 96 which converts the second setting packet having no definition indicating the access destination address into the first setting packet added with the access destination address where the registration destination of the forbidden condition or the authorization condition is mapped. Therefore, the processor 120 can set the forbidden condition or the authorization condition to the APU 110 even if the address mapped to the APU 110 is not informed.

In this way, according to the first to fifth embodiments, the APU is connected to the router (which is a router connected to the shared cache memory 40) closest to the main memory 60 in the router group forming the graphic structure, and the APU examines the memory access performed through the corresponding router. Therefore, the illegal memory access can be detected using a small number of the APUs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
   a memory;
   a plurality of processors that issue a memory access request to the memory;
   a router group that is provided with a first router connected to the memory and a second router forming a transfer path between the first router and the processors, and transmits the memory access request issued from the processors to the memory; and
   an address protection unit that is connected to the first router and examines the memory access request packet input to the first router to detect a violated memory access,
   wherein each of the processors is provided with a processor core that generates the memory access request for the memory, a cache memory, and a packet generator that generates and sends a packet for making a pseudo memory access request in a case where the memory access request of the processor core hits the cache memory, and
   wherein when receiving the packet for making the pseudo memory access request, the first router transmits the received pseudo memory access packet to the address protection unit.

2. The information processing device according to claim 1, wherein the address protection unit is provided with a setting information memory unit that stores setting information in which one or more authorization conditions or forbidden conditions of the memory access are registered, and
   wherein the address protection unit detects the violated memory access based on whether the pseudo memory access request corresponds to the authorization conditions or the forbidden conditions.

3. The information processing device according to claim 2, wherein each of the processors generates a first packet for making a memory access request or a second packet for setting the forbidden conditions or the authorization conditions to detect a memory access violation.

4. The information processing device according to claim 3, wherein the second packet includes an access destination address, a starting address and an ending address of an access forbidden area, a forbidden access type, and an access source ID.

5. The information processing device according to claim 3, wherein the second packet includes an access destination address, a starting address and an ending address of an access authorized area, an authorized access type, and an access source ID.

6. The information processing device according to claim 3,
wherein the first router transmits the second packet to the address protection unit, and
wherein the address protection unit registers the authorization conditions or the forbidden conditions defined in the second packet in the setting information.

7. The information processing device according to claim 1,
wherein the address protection unit is provided with a setting information memory unit that stores setting information in which one or more authorization conditions or forbidden conditions of the memory access are registered, and
wherein the address protection unit detects the violated memory access based on whether the memory access request corresponds to the authorization conditions or the forbidden conditions.

8. The information processing device according to claim 7,
wherein each of the processors generates the first packet which is a packet for making a memory access request or the second packet which is a packet for setting the forbidden conditions or the authorization conditions to detect a memory access violation.

9. The information processing device according to claim 8,
wherein the second packet includes an access destination address, a starting address and an ending address of an access forbidden area, a forbidden access type, and an access source ID.

10. The information processing device according to claim 8,
wherein the second packet includes an access destination address, a starting address and an ending address of an access authorized area, an authorized access type, and an access source ID.

11. The information processing device according to claim 8,
wherein the first router transmits the first packet to the memory and the address protection unit in a case where the input packet is the first packet, and transmits the second packet to the address protection unit in a case where the input packet is the second packet, and
wherein the address protection unit registers the authorization conditions or the forbidden conditions defined in the second packet in the setting information.

12. The information processing device according to claim 11,
wherein the authorization conditions or the forbidden conditions are registered in an address space for each entry, and
wherein the address protection unit registers the authorization conditions or the forbidden conditions in an access destination address defined in the second packet.

13. The information processing device according to claim 8,
wherein the second router selects the router of the next transfer destination based on whether an area indicated by the authorization conditions or the forbidden conditions of the input second packet belongs to the target memory area set in the address protection unit.

14. The information processing device according to claim 8,
wherein the second packet includes a starting address and an ending address of an access forbidden area, a forbidden access type, and an access source ID.

15. The information processing device according to claim 14,
wherein the second router is provided with a packet converter that converts an address indicating the authorization conditions or the forbidden conditions of the second packet into the access destination address and transmits the second packet, and
wherein the address protection unit registers the authorization conditions or the forbidden conditions in the access destination address defined in the converted second packet.

16. The information processing device according to claim 1, wherein the router group is provided with a plurality of the first routers,
wherein the address protection unit is connected to each of the first routers, and
wherein the second router selects a router of a next transfer destination based on whether an access destination address of the input packet belongs to a target memory area set in the address protection unit.

17. The information processing device according to claim 1,
wherein the address protection unit is provided with a register that stores a content of the detected violated memory access.

18. The information processing device according to claim 1,
wherein the address protection unit is provided with a packet generator that makes a first processor among the processors addressed as a destination and generates a notification packet defining a notification on detection of the violated memory access, the first processor being a processor which has made the detected violated memory access.

* * * * *